(12) United States Patent
Izumi et al.

(10) Patent No.: US 10,714,739 B2
(45) Date of Patent: Jul. 14, 2020

(54) LEAD STORAGE BATTERY

(71) Applicant: GS Yuasa International Ltd., Kyoto-shi, Kyoto (JP)

(72) Inventors: Kenji Izumi, Shizuoka (JP); Yu Kojima, Shizuoka (JP); Mikihito Hasegawa, Shizuoka (JP); Shinsuke Ooki, Shizuoka (JP)

(73) Assignee: GS Yuasa International Ltd., Kyoto (JP)

( * ) Notice: Subject to any disclaimer, the term of this patent is extended or adjusted under 35 U.S.C. 154(b) by 5 days.

(21) Appl. No.: 15/748,965

(22) PCT Filed: Jul. 21, 2016

(86) PCT No.: PCT/JP2016/003410
§ 371 (c)(1),
(2) Date: Jan. 30, 2018

(87) PCT Pub. No.: WO2017/022202
PCT Pub. Date: Feb. 9, 2017

(65) Prior Publication Data
US 2019/0006660 A1    Jan. 3, 2019

(30) Foreign Application Priority Data
Aug. 4, 2015    (JP) ................................. 2015-153882

(51) Int. Cl.
*H01M 4/14*    (2006.01)
*H01M 2/36*    (2006.01)
(Continued)

(52) U.S. Cl.
CPC ............ *H01M 4/14* (2013.01); *H01M 2/362* (2013.01); *H01M 4/06* (2013.01); *H01M 10/08* (2013.01);
(Continued)

(58) Field of Classification Search
None
See application file for complete search history.

(56) References Cited

U.S. PATENT DOCUMENTS

| | | | | |
|---|---|---|---|---|
| 2009/0061290 | A1* | 3/2009 | Anzai | H01M 2/1223 429/54 |
| 2013/0022860 | A1* | 1/2013 | Minoura | H01M 4/14 429/163 |

FOREIGN PATENT DOCUMENTS

| | | | |
|---|---|---|---|
| JP | 58184272 | A2 | 10/1983 |
| JP | 2008243489 | A2 | 10/2008 |

(Continued)

OTHER PUBLICATIONS

"TS-004 Knowledge of Automobile Batteries", Apr. 2013, p. 22, issued by the Battery Association of Japan, and its concise explanation in English; Cited in Specification.
(Continued)

*Primary Examiner* — Jonathan Crepeau
*Assistant Examiner* — Angela J Martin
(74) *Attorney, Agent, or Firm* — Rankin, Hill & Clark LLP

(57) ABSTRACT

Disclosed is a lead-acid battery including: a battery container; an electrolyte and an electrode plate group in the battery container; and a battery container cover that hermetically seals an opening of the battery container, wherein the electrode plate group includes a positive electrode plate including a positive electrode active material, a negative electrode plate including a negative electrode active material, and a separator interposed between the positive electrode plate and the negative electrode plate, the battery container cover is provided with a liquid port, a liquid port plug that closes the liquid port, and a sleeve that hangs down from the liquid port to a prescribed liquid surface height of the electrolyte, a sodium ion concentration contained in the (Continued)

electrolyte is 1 mmol/L to 90 mmol/L, and a specific surface area of the positive electrode active material is 5 $m^2/g$ to 9 $m^2/g$.

4 Claims, 1 Drawing Sheet

(51) Int. Cl.
 *H01M 4/06* (2006.01)
 *H01M 10/08* (2006.01)
 *H01M 4/62* (2006.01)
 *H01M 4/02* (2006.01)
(52) U.S. Cl.
 CPC ...... *H01M 4/625* (2013.01); *H01M 2004/021* (2013.01); *Y02E 60/126* (2013.01)

(56) References Cited

FOREIGN PATENT DOCUMENTS

| | | | | |
|---|---|---|---|---|
| JP | 2013020856 A2 | | 1/2013 | |
| JP | 2014-157703 | * | 8/2014 | ............ H01M 10/06 |
| JP | 2014157703 | * | 8/2014 | ............ H01M 10/06 |
| JP | 2014157703 A1 | | 8/2014 | |
| JP | 2015-135804 | * | 7/2015 | ............ H01M 10/06 |
| JP | 2015135804 A2 | | 7/2015 | |
| WO | 2011108056 A1 | | 9/2011 | |
| WO | WO 2011108056 | * | 6/2013 | ............ H01M 10/06 |

OTHER PUBLICATIONS

International Search Report dated Oct. 25, 2016 filed in PCT/JP2016/003410.

* cited by examiner

LEAD STORAGE BATTERY

TECHNICAL FIELD

The present invention relates to a lead-acid battery.

BACKGROUND ART

The lead-acid battery includes, in a battery container, an electrode plate group immersed in an electrolyte, and the opening of the battery container is hermetically sealed with a battery container cover. The electrode plate group includes a stack of a positive electrode plate, a negative electrode plate, and a separator interposed between the positive electrode plate and the negative electrode plate.

The negative electrode plate includes a negative electrode grid, and a negative electrode active material held by the negative electrode grid. Usually, an organic anti-shrink agent such as lignin is added to the negative electrode active material in order to achieve a prolonged life and an enhanced discharge performance at low temperatures. In general, the organic anti-shrink agent contains a sodium salt, so that sodium ions in an amount of several hundreds of mmol/L is dissolved in the electrolyte.

With repeated use of the lead-acid battery, the moisture in the electrolyte is gradually decreased owing to electrolysis and the like. To compensate for this moisture loss, an appropriate amount of water is added.

Since the lead-acid battery is heavily used, for example, for starting an automobile engine, vehicle maintenance workers often perform adding water for the lead-acid battery at the time of a regular vehicle inspection, which is conducted every two years.

A liquid port for adding water is provided in the battery container cover of the lead-acid battery. Normally, the liquid port is sealed with a liquid port plug. During adding water, the liquid port plug is removed, and water is added from the liquid port. A person who performs adding water adds water while visually recognizing the liquid surface inside the battery container. As the method for visually recognizing the liquid surface, the following two methods can be mainly used.

In the first method, the liquid surface is visually recognized on a side surface of the battery container. In this case, water is added using, as references, an upper-limit line and a lower-limit line that are indicated on the side surface of the battery container and that indicate the upper-limit level (UPPER LEVEL) and a lower-limit level (LOWER LEVEL), respectively, of the liquid surface. When the liquid surface is lower than the lower-limit line (the electrolyte amount is small), water is added such that the liquid surface will not pass the upper-limit line.

In the second method, a sleeve (liquid surface instructing device) extending from the liquid port to a prescribed liquid surface height of the electrolyte is used (see NPL 1). The lower end of the sleeve corresponds to the upper-limit level of the liquid surface. If the liquid surface does not reach the lower end of the sleeve when the liquid surface is viewed from the liquid port, water is added until the liquid level reaches the lower end of the sleeve. When the liquid surface reaches the lower end of the sleeve, the liquid surface is raised by surface tension, and the upper surface of the electrode plate group immersed in the electrolyte appears to be distorted through the electrolyte. Consequently, one can know that the liquid surface has reached the lower end of the sleeve.

In order to accurately perform adding water, accurate visual recognition of the position of the liquid surface inside the battery container is important. To enhance the visibility, PTL 1 proposes adding a colorant or a fluorescent substance to the electrolyte. PTL 2 proposes liberating the carbon added to the negative electrode.

CITATION LIST

Patent Literatures

[PTL 1] Laid-Open Patent Publication No. S58-184272
[PTL 2] Laid-Open Patent Publication No. 2013-20856

Non Patent Literature

[NPL 1] "TS-004 Knowledge of Automobile Batteries", P. 22, issued by The Battery Association of Japan

SUMMARY OF INVENTION

Technical Problem

When a colorant or a fluorescent substance is added in the electrolyte as in the case of PTL 1, there is concern that the colorant or the fluorescent substance may cause color migration to the inner surface of the battery container or affect the electrode reaction. On the other hand, when the carbon added in the negative electrode is liberated as in the case of PTL 2, the electrolyte may become blackish and turbid, resulting in a loss in transparency. In addition, the liberated carbon adheres to and agglomerates on the inner surface of the battery container or the electrode plate in the vicinity of the liquid surface, so that the liquid surface tends to be erroneously recognized. Therefore, both of these methods are not practical.

With the recent enhancement in performance of the lead-acid battery, the height (length in the vertical direction) of the electrode plate group has increased, so that the distance between the liquid level and the battery container cover is decreasing. Accordingly, the liquid surface may pass the level of the battery container, and rise to the level of the battery container cover, which cannot be visually recognized from the outside. In this case, it is not possible to indicate the upper-limit line of the liquid surface on the side surface of the battery container.

For the above-described reasons, there is an increasing need to visually recognize the liquid surface by using the sleeve around the liquid port. However, the method that involves the use of the sleeve is to recognize the position of the liquid surface based on changes in the appearance of the electrode plate group seen through the electrolyte. If oscillation or irregular reflection of light occurs on the liquid surface during adding water, it is difficult to perform accurate visual recognition of the position of the liquid surface.

Solution to Problem

It is an object of the present invention to enhance the visibility of the liquid surface in the case of adding water using, as a reference, the lower end of a sleeve (liquid surface instructing device) extending from the liquid port to a prescribed liquid surface height of the electrolyte. That is, the present invention is directed to a lead-acid battery including a positive electrode active material, a negative electrode active material, and an electrolyte that are accommodated inside a battery container, the opening of the battery container being hermetically sealed with a battery container cover provided with a liquid port closed by a liquid port plug, a sleeve hanging down from the liquid port to a prescribed liquid surface height of the electrolyte, and water addition being performed with reference to a lower end of the sleeve, wherein the sodium contained in the electrolyte is set to 1 to 90 mmol/L, and the specific surface area of the positive electrode active material is set to 5 to 9 m²/g.

Here, "mmol/L" refers to the number of millimoles of the sodium ions contained per liter of the electrolyte.

That is, an aspect of the present invention relates to a lead-acid battery including: a battery container; an electrolyte accommodated inside the battery container; an electrode plate group that is accommodated inside the battery container and is immersed in the electrolyte; and a battery container cover that hermetically seals an opening of the battery container, wherein the electrode plate group includes a positive electrode plate including a positive electrode active material, a negative electrode plate including a negative electrode active material, and a separator interposed between the positive electrode plate and the negative electrode plate, the battery container cover is provided with a liquid port, a liquid port plug that closes the liquid port, and a sleeve that hangs down from the liquid port to a prescribed liquid surface height of the electrolyte, a sodium ion concentration contained in the electrolyte is 1 mmol/L to 90 mmol/L, and a specific surface area of the positive electrode active material is 5 m²/g to 9 m²/g.

Advantageous Effects of Invention

According to the above-described aspect of the present invention, it is possible to color the electrolyte into light brown, while maintaining the transparency of the electrolyte, at the time of performing maintenance of a lead-acid battery. Accordingly, the visibility of the liquid surface is enhanced in the case of performing adding water using the lower end of the sleeve as a reference, so that maintenance can be facilitated.

DESCRIPTION OF EMBODIMENT

Figure 1:
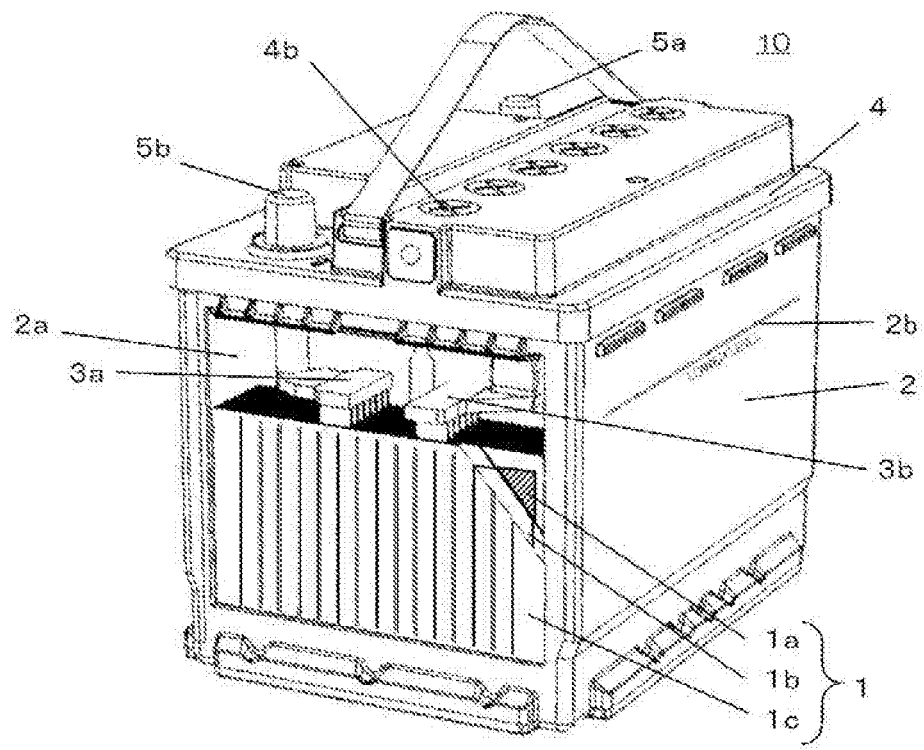
FIG. 1 is a partially cut-out perspective view schematically showing an example of a lead-acid battery according to an embodiment of the present invention.

A lead-acid battery according to an embodiment of the present invention includes a battery container, an electrolyte accommodated inside the battery container, an electrode plate group that is accommodated inside the battery container and is immersed in the electrolyte, and a battery container cover that hermetically seals an opening of the battery container. The electrode plate group includes a positive electrode plate including a positive electrode active material, a negative electrode plate including a negative electrode active material, and a separator interposed between the positive electrode plate and the negative electrode plate. The battery container cover is provided with a liquid port, a liquid port plug that closes the liquid port, and a sleeve that hangs down from the liquid port to a prescribed liquid surface height of the electrolyte. Here, the sodium ion concentration contained in the electrolyte is 1 mmol/L to 90 mmol/L, and the specific surface area of the positive electrode active material is 5 m²/g to 9 m²/g.

By setting the sodium ion concentration contained in the electrolyte and the specific surface area of the positive electrode active material within the above-described ranges, it is possible to color the electrolyte into light brown, while maintaining the transparency of the electrolyte, at a time suitable for adding water to the electrolyte. The time suitable for adding water to the electrolyte is not strictly, but is usually, about two years after the start of use of the lead-acid battery. A period of about two years corresponds to a period between the replacement of a lead-acid battery to a new lead-acid battery on a regular vehicle inspection and the maintenance of the new battery on the next regular vehicle inspection.

As a result of the sodium ion concentration contained in the electrolyte being reduced to 1 to 90 mmol/L, the current value of the lead-acid battery during charging increases, resulting in an enhanced charging efficiency and an increased utilization of the positive electrode active material. In the charge/discharge reaction of the lead-acid battery, the positive electrode active material repeatedly undergoes chemical reaction with a volume change between lead oxide and lead sulfate. Accordingly, an increase in the utilization of the positive electrode active material results in an increase in volume change of the positive electrode active material. When such a volume change is repeated, the binding force of the positive electrode active material is reduced, so that the positive electrode active material is more likely to be liberated from the positive electrode plate.

On the other hand, the larger the specific surface area of the positive electrode active material, the lower the binding force of the positive electrode active material becomes. The smaller the specific surface is, the higher the binding force can be. In the case of reducing the sodium ion concentration contained in the electrolyte to 1 to 90 mmol/L and setting the specific surface area of the positive electrode active material to 5 to 9 m²/g, it is possible, intentionally, to properly liberate the positive electrode active material from the positive electrode plate and color the electrolyte into light brown, in a period of about two years from the start of use of the lead-acid battery, while maintaining the transparency of the electrolyte. This facilitates accurate visual recognition of the liquid surface in the case of adding water using the lower end of the sleeve as a reference. Accordingly, the maintenance of the lead-acid battery that involves adding water is facilitated.

When the sodium ion concentration in the electrolyte becomes higher than 90 mmol/L, the electrolyte coloration tends to be lighter under charge/discharge conditions that ensure a sufficient life even in the case of mounting the lead-acid battery to vehicles using an idling stop or charge control system, which have increasingly come into widespread use.

When the sodium ion concentration in the electrolyte is less than 1 mmol/L, the utilization of the positive electrode active material is excessively increased, resulting in an increase in the amount of the electrolyte consumed. Accordingly, it may be necessary to perform adding water considerably earlier than the time at which about two years have elapsed since the start of use of the lead-acid battery.

When the specific surface area of the positive electrode active material is smaller than 5 m²/g, the liberation of the positive electrode active material from the positive electrode plate does not tend to occur. Therefore, it is difficult to color the electrolyte to such a degree that the liquid surface can be visually recognized accurately at the time when about two years has elapsed since the start of use of the lead-acid battery. On the other hand, when the specific surface area of the positive electrode active material is larger than 9 m$^2$/g, the amount of the positive electrode active material liberated from the positive electrode plate is increased. Accordingly, the electrolyte is colored to such an extent that it loses the transparency at a time significantly earlier than the time when about two years has elapsed since the start of use of the lead-acid battery.

The specific surface area of the positive electrode active material means a specific surface area of the positive electrode active material in a lead-acid battery in a fully charged state (SOC 100%) after formation and means a physical property value measured by the BET (Brunauer-Emmett-Teller) method. Note that the positive electrode active material that has been removed from the lead-acid battery in a fully charged state after formation may be a mixture (hereinafter referred to as a "positive electrode material") containing a trace amount of an additive other than the positive electrode active material. However, the specific surface area of such a positive electrode material practically reflects the specific surface area of the positive electrode active material, and can be regarded as the specific surface area of the positive electrode active material.

The specific surface area of the positive electrode active material can be measured by the following method. First, the lead-acid battery in a fully charged state after formation is disassembled to remove the positive electrode plate, and the positive electrode plate is washed with running water for two hours, followed by drying. Approximately 2 g of the positive electrode active material or the positive electrode material is collected from the dried positive electrode plate, and used as a measurement sample. Before starting the measurement of the specific surface area, the measurement sample is further subjected to vacuum drying at 100° C. for one hour. A cell containing the sample is immersed in liquid nitrogen. Using nitrogen as an adsorption gas, the specific surface area may be measured by using a BET specific surface area measurement device (e.g., a Tri Star 3000 manufactured by SHIMADZU CORPORATION).

In a lead-acid battery including a sleeve, the lower end of the sleeve indicates a prescribed liquid surface height of the electrolyte. When the lower end of the battery sleeve is located downward of the lower end of the battery container cover in the vertical direction, the smaller the gap between the lower end of the sleeve and the lower end of the battery container cover, the more difficult the visual recognition of the liquid surface located at the upper-limit level from the side surface of the battery container is. In particular, when the gap between the lower end of the sleeve and the lower end of the battery container cover is 3 mm or less, the need to visually recognize the liquid surface by using the sleeve around the liquid port becomes more significant. When the lower end of the sleeve is located upward of the lower end of the battery container cover in the vertical direction, the liquid surface located at the upper-limit level cannot be visually recognized from the side surface of the battery container. Therefore, it is necessary to perform adding water using the lower end of the sleeve as a reference. Here, the vertical direction refers to a direction perpendicular to the liquid surface when the lead-acid battery is installed horizontally.

Figure 2:
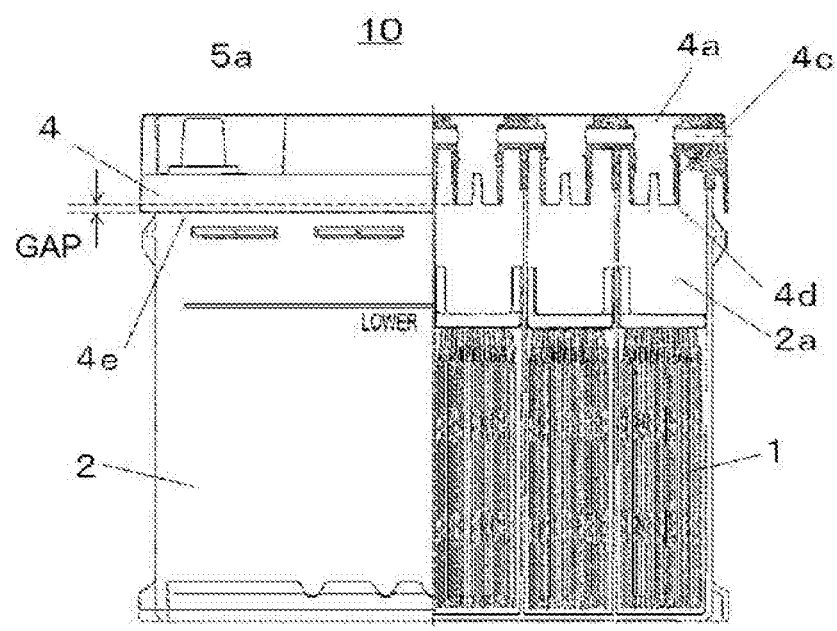
FIG. 2 is a partial cross-sectional view schematically showing an example of a lead-acid battery according to an embodiment of the present invention, with a liquid port plug being removed.

Hereinafter, an embodiment of the present invention will be described with reference to FIGS. 1 and 2. However, it should be appreciated that the present invention is not limited by FIGS. 1 and 2. FIG. 1 is a perspective view schematically showing an example of a lead-acid battery according to an embodiment of the invention, showing an internal structure with a portion being cut away. FIG. 2 is a partial cross-sectional view schematically showing the same lead-acid battery with a liquid port plug being removed.

A lead-acid battery 10 includes an electrode plate group 1 and an electrolyte (not shown), which are accommodated in a battery container 2. The battery container 2 is partitioned by partition walls into a plurality of (in the illustrated example, six) cell compartments 2a. One electrode plate group 1 is housed in each cell compartment 2a, and the electrolyte is also accommodated. A lower-limit line 2b indicating a lower-limit level (LOWER LEVEL) of the liquid surface of the electrolyte is engraved on the battery container 2. A battery container cover 4 provided with a pair of external terminals 5a and 5b is attached to the opening of the battery container 2. The battery container cover 4 is provided with a liquid port 4a for each cell compartment 2a. The liquid port 4a is closed with the liquid port plug 4b. Below the liquid port 4a, a sleeve 4c hangs down to a prescribed liquid surface height in order to indicate the prescribed liquid surface height. A lower end 4d of the sleeve 4c corresponds to the upper-limit level of the liquid surface of the electrolyte during adding water.

In the electrode plate group 1, a plurality of positive electrode plates 1a and a plurality of negative electrode plates 1b are alternately stacked with separators 1c interposed therebetween. In a cell compartment 2a located at one end portion, a strap or first connection part 3a that connects the plurality of positive electrode plates 1a (or the plurality of negative electrode plates 1b) in parallel is connected to one external terminal, and a strap or second connection part 3b that connects the plurality of negative electrode plates 1b (or the plurality of positive electrode plates 1a) in parallel is connected to another electrode plate group 1 accommodated in the adjacent cell compartment 2a. The electrode plate groups 11 of the adjacent cell compartments 14 are connected in series. After housing the electrode plate group 1 and the electrolyte inside each of the plurality of cell compartments 2a, and connecting the adjacent electrode plate groups 1, the opening of the battery container 2 is closed with the battery container cover 4.

In general, the positive electrode of a lead-acid battery includes a positive electrode grid (e.g., expanded grid or cast grid), and a positive electrode material held by the positive electrode grid. The positive electrode grid is formed of lead or a lead alloy. The positive electrode material may contain carbon black, a polymer binder, and the like, in addition to the positive electrode active material. As the positive electrode active material, lead oxide ($PbO_2$) can be used.

In general, the negative electrode of a lead-acid battery includes a negative electrode grid (e.g., expanded grid or cast grid), and a negative electrode material held by the negative electrode grid. The negative electrode grid is formed of lead or a lead alloy. The negative electrode material may include an organic condensate such as lignin, barium sulfate, carbon black and the like, in addition to the negative electrode active material. As the negative electrode active material, lead (e.g., spongy lead) can be used. To produce an unformed negative electrode, a lead powder or lead oxide may be used. In the lead-acid battery in the fully charged state after formation, the organic condensate content in the negative electrode material is, for example, preferably 0.05 to 0.5 parts by mass per 100 parts by mass of the negative electrode active material (lead).

Examples of the separator include a microporous film and a fiber sheet. As the polymer material constituting the microporous film or fiber sheet, it is preferable to use a polymer material having acid resistance. Examples thereof include polyolefins such as a polyethylene and polypropylene. The fiber sheet is formed using a polymer fiber and/or an inorganic fiber such as a glass fiber.

The electrolyte is an aqueous solution containing sulfuric acid, and the specific gravity at 20° C. of the electrolyte contained in the battery in a fully charged state after formation is, for example, 1.10 to 1.35 g/cm$^3$, preferably 1.20 to 1.35 g/cm$^3$. The ratio (Me/Mp) of the mass (Me) of the electrolyte to the mass (Mp) of the positive electrode active material or positive electrode material contained in the battery in the fully charged state is controlled within the range of 1.3 to 2.6, preferably 1.5 to 2.0. Here, the mass (Me) of the electrolyte is a mass when the liquid surface of the electrolyte is at the upper-limit level (prescribed liquid surface height) inside the battery container.

In FIG. 2, the lower end 4$d$ of the sleeve 4$c$ is located upward of a lower end 4$e$ of the battery container cover 4 in the vertical direction. Therefore, it is difficult to provide an upper-limit line indicating the upper-limit level (UPPER LEVEL) of the liquid surface on a side surface of the battery container 2. Even if the upper-limit line is provided, the battery container cover 4 obstructs visual recognition, making it difficult to recognize the liquid surface from the side surface.

Even when the lower end 4$d$ of the sleeve is located downward of the lower end 4$e$ of the battery container cover 4 in the vertical direction, it may be difficult to recognize the liquid surface from the side surface. For example, when the gap (height difference in the vertical direction) between the lower end 4$d$ of the sleeve and the lower end 4$e$ of the battery container cover 4 is 3 mm or less, a meniscus phenomenon of the electrolyte or a slight inclination of the installation location of the lead-acid battery makes it difficult for the liquid surface to be viewed from the side surface of the battery container 2.

As described above, when the liquid surface of the electrolyte is not easily viewable or not viewable, the position of the liquid surface needs to be confirmed based on the change of the liquid surface when the liquid surface has reached the lower end 4$d$ of the sleeve. Therefore, it is important to enhance the visibility of the liquid surface.

EXAMPLES

Hereinafter, the present invention will be described in detail by way of examples. However, the present invention is not limited to the following examples.

An electrolyte made of dilute sulfuric acid having a specific gravity of 1.28 was prepared, and LN2-type lead-acid batteries defined in the EN standard and having different sodium ion concentrations in the electrolyte and different specific surface areas of the positive electrode active material were produced according to the following procedure. Here, by varying the sodium ion concentration in the electrolyte in the range of 0.1 to 210 mmol/L, and varying the specific surface area of the positive electrode active material in the range of 4 to 10 m$^2$/g, 25 types of lead-acid batteries that satisfy the matrixes shown in Tables 1 to 3 were produced.

(1) Positive Electrode Plate

To adjust the specific surface area of the positive electrode active material after formation, a positive electrode paste was prepared by kneading a lead oxide powder, dilute sulfuric acid, and purified water at a predetermined ratio. Meanwhile, a Pb—Sn—Sb alloy sheet (Sn content: 1.1 mass %, Sb content: 1.5 mass %) was expanded by a reciprocating method, to give a continuum of positive electrode grids. The positive electrode paste was applied to the continuum of the positive electrode grids, followed by cutting into a predetermined dimension, to produce an unformed positive electrode plate. At this time, five types of positive electrode plates were produced such that the specific surface area of the positive electrode active material is 4 m$^2$/g, 5 m$^2$/g, 6 m$^2$/g, 9 m$^2$/g, or 10 m$^2$/g in a fully charged state after formation.

Here, to change the specific surface area of the positive electrode active material, the amount of the dilute sulfuric acid or water relative to the lead powder may be adjusted, or the sulfuric acid concentration in the dilute sulfuric acid may be adjusted. It is also possible to add tin sulfate, tin oxide, phosphate, or the like to the positive electrode active material.

(2) Negative Electrode Plate

A negative electrode material obtained by adding an organic anti-shrink agent (lignin), barium sulfate, carbon, and the like to a lead oxide powder by an ordinary method was kneaded with dilute sulfuric acid and purified water to prepare a negative electrode paste. Meanwhile, a Pb—Ca—Sn alloy sheet with a Pb—Sb alloy foil attached thereto was expanded by a reciprocating method, to give a negative electrode grid. The negative electrode paste was applied to the negative electrode grid, to produce a negative electrode plate. The amount of carbon added to the negative electrode active material (lead oxide powder before formation) was 0.1 mass %.

(3) Electrode Plate Group

After being aged and dried, the positive electrode plate and the negative electrode plate were alternately stacked with a polyethylene separator interposed therebetween, to produce a plurality of electrode plate groups, which were respectively accommodated in a plurality of cell compartments of the battery container. In each electrode plate group, ear portions of the positive electrode plate and the negative electrode plate were connected to their respective straps, and the straps having opposite polarities of the adjacent electrode plate groups were connected to each other. The strap of the positive electrode plate in the cell compartment at one end portion was connected to a positive external terminal, and the strap of the negative electrode plate in the cell compartment at the other end portion was connected to a negative external terminal. Then, the opening of the battery container was sealed with the battery container cover, and the electrolyte was injected from the liquid port. After injection of the electrolyte, formation was performed.

Note that, below the liquid port, a sleeve is formed to a position corresponding to the upper-limit level of the liquid surface of the electrolyte. The electrolyte was injected to the position of the lower end of the sleeve.

(4) Quantitative Analysis of Sodium Ions

The ratio (Me/Mp) of the mass (Me) of the electrolyte to the mass (Mp) of the positive electrode active material (positive electrode material) contained in the lead-acid battery in a fully charged state after formation was 1.5. After about 30 minutes from the completion of formation, a small amount of the electrolyte was sampled from the liquid port in order to perform quantitative analysis of sodium ions. Thereafter, the liquid port was sealed with the liquid port plug having an exhaust port for bringing the inside of the battery into communication with the external space. The quantitative analysis of the sodium ions contained in the sampled electrolyte showed that 210 mmol/L of sodium ions were contained in the electrolyte. Many batteries similar to this battery were prepared.

Furthermore, batteries having sodium ion concentrations in the electrolyte of 90 mmol/L, 15 mmol/L, 1 mmol/L, and 0.1 mmol/L were produced by repeating the following procedures (a) to (c) once to four times.

(a) The liquid port plug is opened, and the battery is turned upside down to discharge the electrolyte.

(b) A fresh electrolyte is injected, and the liquid port is closed with the liquid port plug, and was stood still for about two hours.

(c) The liquid port plug is opened, then a small amount of the electrolyte is sampled from the liquid port, and quantitative analysis of the sodium ions contained in the electrolyte is performed.

Here, in a new lead-acid battery before charge/discharge or before use, the sodium ion concentration hardly changes from the initial set value.

Next, a method for testing the obtained lead-acid batteries and the test results will be described below in detail.

<Life Characteristics>

After each of the produced lead-acid batteries had been brought into a fully charged state, evaluation was made under an environment in which the ambient temperature was kept at 25±1° C. by using the following procedures.

A: Each battery is discharged at a discharge current of 45 A for 59 seconds.

B: The battery is discharged at a discharge current of 300 A for one second.

C: The battery is subjected to constant voltage charge at 14.0 V for 60 seconds under a condition of a limited current of 100 A.

D: A charge/discharge cycle of performing A, B, and C in this order is repeated 3600 cycles, followed by leaving the battery for 40 to 48 hours.

In the process of repeating the procedures A to D, the battery is determined to have reached the end of its life when the discharge voltage fell below 7.2 V, and the accumulated number of cycles was recorded as the life in Table 1.

<Transition of Liquid Surface>

In the evaluation of the life characteristics, the position of the liquid surface was visually checked from the side surface of the battery container at 40000 cycles. If the position was at or above the lower-limit line (LOWER LEVEL), the battery was rated as "A". If the position was below the lower-limit line, the battery was rated as "B". These ratings were recorded in Table 2. Here, 40000 cycles correspond to about two years of use of a lead-acid battery used in a general manner in the market. Each of the batteries that had reached the end of its life before 40000 cycles was excluded from evaluation, and "-" was recorded.

<Visibility of Liquid Surface>

In the evaluation of the life characteristics, the turbidity of the liquid surface was visually checked from the liquid port at 40000 cycles. The state in which the electrolyte was colored into light brown while maintaining the transparency was rated as "A", and the state in which the electrolyte was not colored was rated as "B", and the ratings were recorded in Table 3. Each of the batteries that had reached the end of its life before 40000 cycles was excluded from the evaluation, and "-" was recorded.

TABLE 1

| | | Sodium ion concentration in electrolyte (mmol/L) | | | | |
|---|---|---|---|---|---|---|
| | | 210 | 90 | 15 | 1 | 0.1 |
| Specific surface area of positive electrode active material ($m^2/g$) | 4 | 25000 | 40000 | 60000 | 80000 | 75000 |
| | 5 | 25000 | 40000 | 60000 | 75000 | 70000 |
| | 6 | 25000 | 40000 | 60000 | 70000 | 65000 |
| | 9 | 25000 | 40000 | 40000 | 40000 | 40000 |
| | 10 | 15000 | 15000 | 13000 | 10000 | 9000 |

TABLE 2

| | | Sodium ion concentration in electrolyte (mmol/L) | | | | |
|---|---|---|---|---|---|---|
| | | 210 | 90 | 15 | 1 | 0.1 |
| Specific surface area of positive electrode active material ($m^2/g$) | 4 | — | A | A | A | B |
| | 5 | — | A | A | A | B |
| | 6 | — | A | A | A | B |
| | 9 | — | A | A | A | B |
| | 10 | — | — | — | — | — |

A: The liquid surface position is at or above the LOWER line at a life of 40000 cycles.
B: The liquid surface position is below the LOWER line at a life of 40000 cycles.

TABLE 3

| | | Sodium ion concentration in electrolyte (mmol/L) | | | | |
|---|---|---|---|---|---|---|
| | | 210 | 90 | 15 | 1 | 0.1 |
| Specific surface area of positive electrode active material ($m^2/g$) | 4 | — | B | B | B | B |
| | 5 | — | A | A | A | A |
| | 6 | — | A | A | A | A |
| | 9 | — | A | A | A | A |
| | 10 | — | — | — | — | — |

A: The liquid is turbid at a life of 40000 cycles.
B: The liquid is not turbid at a life of 40000 cycles.

In the following, the results of evaluation will be described in detail.

<Life Characteristics>

As shown in Table 1, the lead-acid battery having a sodium ion concentration in the electrolyte of 210 mmol/L suffered from insufficient charging, and had a life of 40000 cycles or less. The lead acid battery having a specific surface area of the positive electrode active material of 10 $m^2/g$ experienced significant detachment of the positive electrode active material from the positive electrode plate occurred, and had a life of 20000 cycles or less. On the other hand, the lead-acid battery having a sodium ion concentration in the electrolyte of 0.1 to 90 mmol/L, and a specific surface area of the positive electrode active material of 4 to 9 $m^2/g$ had a life of 40000 cycles or above. In other words, these lead-acid batteries were determined to have excellent life characteristics that would not reach the end of their lives before the next regular vehicle inspection.

<Transition of Liquid Surface>

As shown in Table 2, for the lead-acid battery having a sodium ion concentration in the electrolyte of 0.1 mmol/L, the liquid surface fell below the lower-limit line (LOWER LEVEL) at the time when the life reached 40000 cycles, resulting in a state in which the lead-acid battery needed addition of water before the time of a regular vehicle inspection. This is presumably because an excessive increase in the utilization of the positive electrode active material accelerated the reduction of the electrolyte. On the other hand, for the lead-acid battery having a sodium ion concentration in the electrolyte of 1 to 90 mmol/L and a specific surface area of the positive electrode active material of 4 to 9 m$^2$/g, the liquid surface did not fall below the lower-limit line (LOWER LEVEL), achieving a favorable result.

<Visibility of Liquid Surface>

As shown in Table 3, for the lead-acid battery having a specific surface area of the positive electrode active material of 4 m$^2$/g, no coloration of the electrolyte was observed at the time when the life reached 40000 cycles. On the other hand, for the lead-acid battery having a sodium ion concentration in the electrolyte of 0.1 to 90 mmol/L and a specific surface area of the positive electrode active material of 5 to 9 m$^2$/g, the electrolyte was colored into light brown while maintaining the transparency. In this state, the visibility of the liquid surface has been enhanced, so that water could be easily and accurately added to the lower end of the sleeve by looking the liquid surface through the liquid port.

As described thus far, it is evident that the sodium ion concentration in the electrolyte may preferably be set to 1 to 90 mmol/L, and the specific surface area of the positive electrode active material may preferably be set to 5 to 9 m$^2$/g. This makes it possible to liberate a proper amount of the positive electrode active material from the positive electrode plate so as to color the electrolyte into light brown while maintaining the transparency thereof, approximately after two years after the start of use (corresponding to the period of time between a regular vehicle inspection and the next regular vehicle inspection). Accordingly, is possible to enhance the visibility of the liquid surface so as to easily and accurately perform adding water in a lead-acid battery to which water is added from the liquid port, using, as a reference, the lower end of the sleeve that is formed to extend to the prescribed liquid surface height of the electrolyte.

INDUSTRIAL APPLICABILITY

The above-described configuration according to the present invention is useful for a liquid-type lead-acid battery to which water is added using the lower end of the sleeve as a reference, and is particularly useful for a lead-acid battery used for starting an automobile engine, for example.

REFERENCE SIGNS LIST

1. . . . Electrode plate group
1a . . . . Positive electrode plate
1b . . . . Negative electrode plate
1c . . . . Separator
2. . . . Battery container
2a . . . . Cell compartment
2b . . . . Lower-limit line (LOWER LEVEL) of liquid surface
3a, 3b . . . . Connection part
4. . . . Battery container cover
4a . . . . Liquid port
4b . . . . Liquid port plug
4c . . . . Sleeve
4d . . . . Lower end of sleeve
4e . . . . Lower end of battery container cover
5a, 5b . . . . External terminal
10. . . . Lead-acid battery

The invention claimed is:

1. A lead-acid battery comprising:
a battery container;
an electrolyte accommodated inside the battery container;
an electrode plate group that is accommodated inside the battery container and is immersed in the electrolyte; and
a battery container cover that hermetically seals an opening of the battery container, wherein
the electrode plate group includes a positive electrode plate including a positive electrode active material, a negative electrode plate including a negative electrode active material, and a separator interposed between the positive electrode plate and the negative electrode plate,
the battery container cover is provided with a liquid port, a liquid port plug that closes the liquid port, and a sleeve that hangs down from the liquid port to a prescribed liquid surface height of the electrolyte,
a sodium ion concentration contained in the electrolyte is 1 mmol/L to 90 mmol/L, and
a specific surface area of the positive electrode active material is 5 m$^2$/g to 9 m$^2$/g.

2. The lead-acid battery in accordance with claim 1, wherein
a lower end of the sleeve is located downward of a lower end of the battery container cover in a vertical direction, and
a gap between the lower end of the sleeve and the lower end of the battery container cover is 3 mm or less.

3. The lead-acid battery in accordance with claim 1, wherein
a lower end of the sleeve is located upward of a lower end of the battery container cover in a vertical direction.

4. The lead-acid battery in accordance with claim 1, wherein
a ratio (Me/Mp) of a mass (Me) of the electrolyte to a mass (Mp) of the positive electrode active material or a positive electrode material contained in the lead-acid battery in a fully charged state is within a range of 1.3 to 2.6.

* * * * *